UNITED STATES PATENT OFFICE.

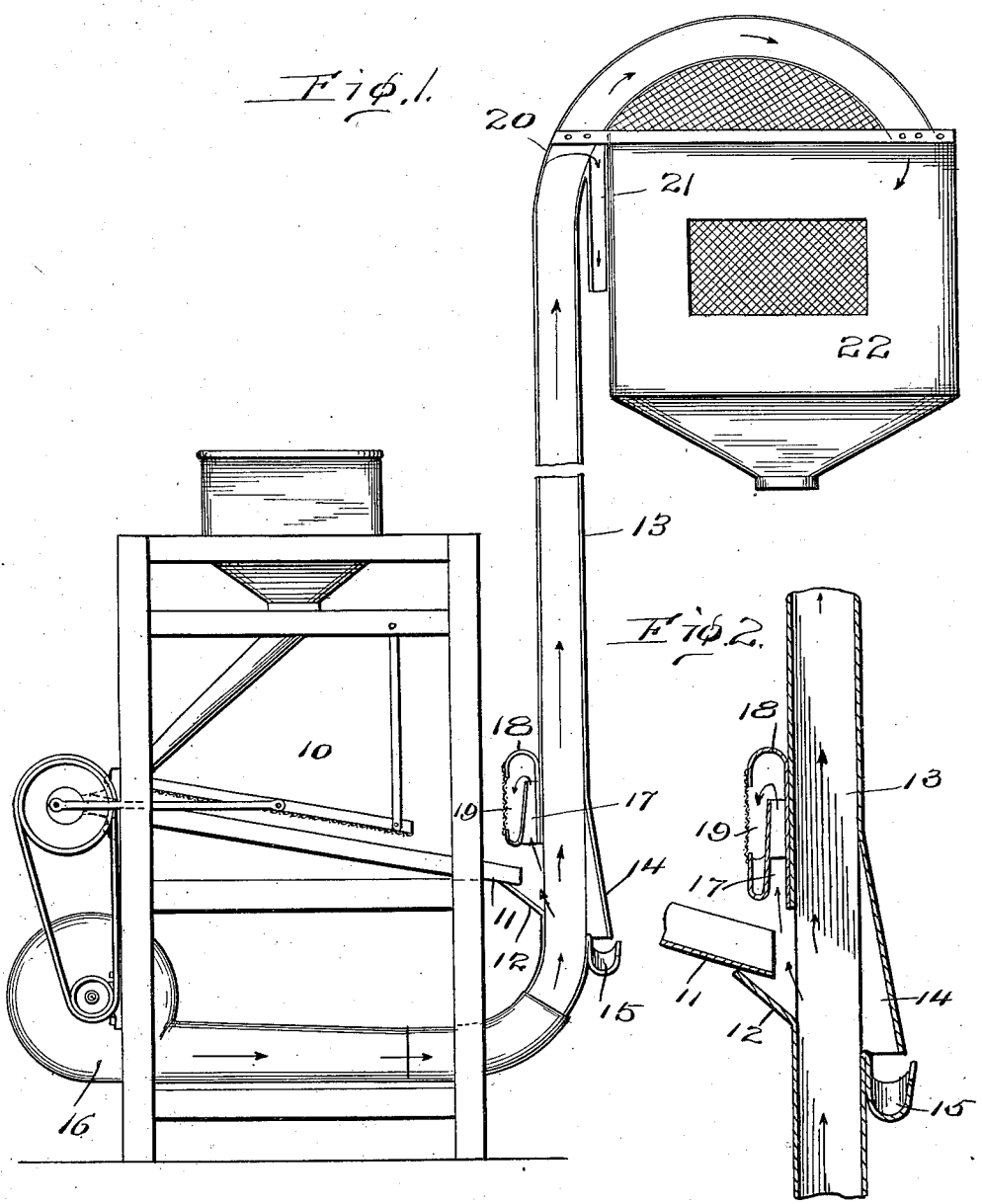

AXEL T. HEDFELDT AND HARRY HAGER, OF CHICAGO, ILLINOIS.

WINNOWING-MACHINE.

1,028,022.   Specification of Letters Patent.   Patented May 28, 1912.

Application filed July 20, 1911. Serial No. 639,623.

*To all whom it may concern:*

Be it known that we, AXEL T. HEDFELDT and HARRY HAGER, citizens of the United States, residing at Chicago, in the county of Cook and State of Illinois, have invented certain new and useful Improvements in Winnowing - Machines; and we do hereby declare the following to be a full, clear, and exact description of the invention, such as will enable others skilled in the art to which it appertains to make and use the same.

This invention relates to winnowing machines and has for an object to provide a machine adapted for winnowing a variety of materials but especially desirable for winnowing and cleaning coffee.

A further object of the invention is to provide a device adapted to receive coffee or other materials from a shaking screen and to subject the same to an air current which moves the coffee and also simultaneously cleans foreign substances and extraneous matter therefrom.

A further object of the invention is to provide a chute through which passes an air current with means for projecting the coffee to be cleaned across and into such chute and into the sphere of action of such air current with provision for permitting heavier substances to drop from association with the coffee and for lighter substances to be thrown by the air current out of association with the coffee.

With these and other objects in view the invention comprises certain novel constructions, combinations, and arrangements of parts as will be hereinafter more fully described and claimed.

In the drawings: Figure 1 is a view in side elevation with certain parts broken away of the complete device. Fig. 2 is a view in vertical section of a fragment of the air chute located adjacent to the shaking screen.

Like characters of reference designate corresponding parts throughout the several views.

An ordinary coffee cleaning machine comprising shaking screens is illustrated at 10 the lower screen or chute 11 discharging upon a lip 12 offset from the air chute 13. The position of the lip 12 and screen 11 is such that as the coffee and foreign substances are discharged therefrom any stones or balls of dirt which may be contained in such coffee by reason of the greater gravity of such stones and the like pass through and across the chute 13 and through an opening 14 into a trough 15 from which they are discharged.

A current of air, as indicated by the arrows, from the fan 16 passes upwardly through the chute 13 so that the lighter coffee grains instead of passing over into the trough 15 are deflected by the air current and pass up the chute, while lighter material as chaff or the like which is contained in the coffee is caught by a current of air before the material passes into the chute and is blown upwardly through a passage 17 against a deflector plate 18 and drops into a screened receptacle or passage 19 from which it is later discharged. The coffee berries proper still possibly containing some small light stones or balls of mud pass upwardly through the chute 13 until they strike the curve of the chute at about the point indicated at 20 when the heavier particles are deflected as indicated by the arrow at that point into a passage 21 and discharged therefrom, the coffee berries passing along the segment of the chute into the receptacle 22 which is properly screened to permit the escape of the air but to prevent the escape of the coffee berries.

The arrangement of the passages 14 and 17 with their discharge troughs or receptacles 15 and 19 respectively are designed to remove from association with the coffee berries practically all of the foreign substances but the additional passage 21 adjacent the curve 20 is provided for taking care of any heavy materials which fail to pass over into the trough 15.

We claim:

1. In a winnowing machine, a column having a bend and openings upon the opposite sides, the inlet opening being higher than the outlet opening, means to permit a passage of air upwardly through the column, means to project material into the inlet opening across the column and out of the outlet opening, a screened receptacle positioned above the inlet opening and provided with a bend to retain material forced upwardly by the current of air, a screened receptacle in the under side of the column positioned substantially at the bend, and a discharge pipe substantially at the bend between the column and the last mentioned screened receptacle.

2. In a winnowing machine, a column having openings upon opposite sides of the column, the inlet opening being higher than the outlet opening, means to permit a current of air upwardly through the column, means to project material into the inlet opening across the column and out of the outlet opening, a conduit positioned beside the column immediately above the inlet opening and a screened receptacle separated from said passage by the bend therein.

3. In a winnowing machine, a vertical column having openings formed upon opposite sides of the column, the inlet opening being higher than the outlet opening, means to produce a current of air upwardly through said column, means to project material into the inlet opening and across and out of the outlet opening, and a receiving member disposed upon the exterior of the column immediately above the inlet opening formed as a return bend having its open end deflected downwardly with a screen in the downwardly projecting closed portion adapted to prevent the passage of material but permitting the passage of air.

In testimony whereof we affix our signatures in presence of two witnesses.

AXEL T. HEDFELDT.
HARRY HAGER.

Witnesses:
JAY D. MILLER,
ALBERT G. HUBBARD.

Copies of this patent may be obtained for five cents each, by addressing the "Commissioner of Patents, Washington, D. C."